United States Patent
Tione

(10) Patent No.: US 11,904,827 B2
(45) Date of Patent: Feb. 20, 2024

(54) ROTATIONAL MONITORING SYSTEM OF AT LEAST ONE AXLE FOR A RAILWAY VEHICLE OR TRAIN

(71) Applicant: FAIVELEY TRANSPORT ITALIA S.P.A., Turin (IT)

(72) Inventor: Roberto Tione, Turin (IT)

(73) Assignee: FAIVELEY TRANSPORT ITALIA S.P.A., Piossasco (IT)

(*) Notice: Subject to any disclaimer, the term of this patent is extended or adjusted under 35 U.S.C. 154(b) by 295 days.

(21) Appl. No.: 17/594,667

(22) PCT Filed: Apr. 28, 2020

(86) PCT No.: PCT/IB2020/053994
§ 371 (c)(1),
(2) Date: Oct. 25, 2021

(87) PCT Pub. No.: WO2020/222120
PCT Pub. Date: Nov. 5, 2020

(65) Prior Publication Data
US 2022/0203946 A1    Jun. 30, 2022

(30) Foreign Application Priority Data
Apr. 30, 2019  (IT) .................. 102019000006453

(51) Int. Cl.
*B60T 8/32* (2006.01)
*B60T 8/17* (2006.01)
(Continued)

(52) U.S. Cl.
CPC ........ *B60T 8/1705* (2013.01); *B60T 8/17616* (2013.01); *B60T 8/3245* (2013.01);
(Continued)

(58) Field of Classification Search
CPC .... B60T 8/3655; B60T 8/3245; B60T 8/1705; B60T 13/266; B60T 8/17616; B60T 2270/10; B60T 13/683; B60T 13/365
See application file for complete search history.

(56) References Cited

U.S. PATENT DOCUMENTS 9,383,393 B2 * 7/2016 Gerber ............. G01R 19/16576
9,842,496 B1 * 12/2017 Hayward ............. G08G 1/0112
(Continued)

FOREIGN PATENT DOCUMENTS

EP    1577185 A1    9/2005
EP    3148853 B1    4/2018
(Continued)

OTHER PUBLICATIONS

Barna, Theoretical analysis of Wheel Slide Protection controllers for rail vehicles, 2011, IEEE, p. 230-235 (Year: 2011).*
(Continued)

*Primary Examiner* — Mcdieunel Marc
(74) *Attorney, Agent, or Firm* — McCoy Russell LLP

(57) ABSTRACT

A rotational monitoring system of at least one axle designed to identify at least one axle controlled by it having an estimated instantaneous linear speed lower than a predetermined instantaneous linear limit speed, and remove the braking force to one or more wheels of the axle identified to have an estimated instantaneous linear speed lower than the predetermined instantaneous linear limit speed, by canceling a pressure to brake cylinders associated with the at least one axle identified to have an estimated instantaneous linear speed lower than the predetermined instantaneous linear limit speed. The cancellation of a pressure is obtained by acting on an electro-pneumatic valve designed to perform a Remote Release function associated with the pneumatic
(Continued)

circuits generating braking pressure for the brake cylinders and adapted to cancel a residual braking pressure.

5 Claims, 6 Drawing Sheets

(51) Int. Cl.
*B60T 8/1761* (2006.01)
*B60T 8/36* (2006.01)
*B60T 13/36* (2006.01)
*B60T 13/68* (2006.01)

(52) U.S. Cl.
CPC .......... *B60T 8/3655* (2013.01); *B60T 13/365* (2013.01); *B60T 13/683* (2013.01); *B60T 2270/10* (2013.01)

(56) References Cited

U.S. PATENT DOCUMENTS

| | | | |
|---|---|---|---|
| 9,948,085 B2* | 4/2018 | Nagahama | H02H 7/228 |
| 9,979,352 B2* | 5/2018 | Hur | H03F 1/0288 |
| 9,996,551 B2* | 6/2018 | Bare | G02B 27/017 |
| 2022/0009535 A1* | 1/2022 | Weiner | B25J 9/1674 |
| 2023/0042019 A1* | 2/2023 | Tione | G06N 3/08 |
| 2023/0118873 A1* | 4/2023 | Seminara | B60T 13/265 |
| | | | 303/7 |

FOREIGN PATENT DOCUMENTS

| | | |
|---|---|---|
| EP | 2830918 B1 | 5/2018 |
| EP | 3393873 B1 | 11/2019 |
| JP | 5699041 B2 | 4/2015 |
| WO | 2013144543 A2 | 10/2013 |
| WO | 2017021837 A1 | 2/2017 |
| WO | 2017175108 A1 | 10/2017 |
| WO | 2019053599 A1 | 3/2019 |

OTHER PUBLICATIONS

Ma et al., Slip Ratio Control in Rail Vehicle Braking with Sliding Mode Control Method, 2020, IEEE, p. 160-164 (Year: 2020).*

Subramanian et al., A Diagnostic System for Air Brakes in Commercial Vehicles, 2006, IEEE, p. 360-376 (Year: 2006).*

Kang et al., Braking control for wheel-slide protection using HILS, 2017, IEEE, p. 2021-20. (Year: 2017).*

ISA European Patent Office, International Search Report Issued in Application No. PCT/IB2020/053994, dated Sep. 8, 2020, WIPO, 2 pages.

Intellectual Property India, Examination Report Issued in Application No. 202147049288, dated Mar. 25, 2022, 5 pages.

* cited by examiner

ROTATIONAL MONITORING SYSTEM OF AT LEAST ONE AXLE FOR A RAILWAY VEHICLE OR TRAIN

CROSS REFERENCE TO RELATED APPLICATIONS

The present application is a U.S. National Phase of International Application No. PCT/IB2020/053994 entitled "ROTATIONAL MONITORING SYSTEM OF AT LEAST ONE AXLE FOR A RAILWAY VEHICLE OR TRAIN," and filed on Apr. 28, 2020. International Application No. PCT/IB2020/053994 claims priority to Italian Patent Application No. 102019000006453 filed on Apr. 30, 2019. The entire contents of each of the above-listed applications are hereby incorporated by reference for all purposes.

TECHNICAL FIELD

The present invention generally relates to the field of railway braking systems; in particular, the invention relates to a rotational monitoring system of at least one axle for a railway vehicle or train.

BACKGROUND ART

In the railway transport system, the instantaneous adhesion value between the wheel and the rail represents the maximum braking force limit currently applicable to the axles without the wheels of said axles starting a progressive slipping phase.

If an axle enters the slipping phase, if the applied braking force is not promptly and suitably reduced, the axle gradually loses angular speed until it reaches complete locking, with consequent immediate overheating and serious damage due to overtemperature of the surface of the wheels of said axle at the point of contact between the wheels and the rail.

It is known that the situation just described, in addition to significantly lengthening the stopping distances due to a further reduction in the friction coefficient, can cause a derailment at high operating speeds of the railway vehicle.

To overcome the drawback described, pneumatic railway braking systems are equipped with a protection system, known as an anti-slip system.

A known anti-slip system is illustrated by way of example in FIG. 1, in the case of a four-axle railway vehicle. A braking system produces the pneumatic braking pressure as a function of a request for braking pressure or braking force, not shown in FIG. 1, by supplying brake cylinders.

Each brake cylinder is in charge of braking a respective axle, by means of pneumatic ducts. Four anti-slip valve units, piloted by the anti-slip device, are interposed between the pneumatic supply conduits and the respective brake cylinders.

Angular speed sensors detect the angular speed of the axles, respectively. Said angular speed sensors are electrically connected to the anti-slip device, continuously supplying an electric signal representing the instantaneous angular speed information of each axle.

The anti-slip device continuously estimates the instantaneous linear speed of the vehicle through operations performed on the information of the estimated instantaneous linear speed of the axles derived from the relative measured angular speeds.

Continuously evaluating differences AV between the estimated instantaneous linear speed of the single axle and the estimated instantaneous linear speed of the vehicle, the anti-slip device detects whether one or more axles have started a slipping phase. If one or more axles have started a slipping phase, the anti-slip device controls the slipping of said axles by appropriately reducing and modulating the pressure to the brake cylinders relating to the slipping axles, acting on the valve units relating to said slipping axles by means of known algorithms, for example described in EP3393873, WO2017175108, preventing said axles from incurring a blocking state and trying to obtain the best braking force while remaining in the slipping phase.

Said anti-slip valve units may each assume the detailed shape represented by the pair of electro-pneumatic valves, illustrated in FIG. 2.

The electro-pneumatic valves are energized by the anti-slip device by means of respective switching elements. Such switching elements are typically solid state electronic components.

For simplicity of illustration, FIG. 2 does not show the connection of solenoids, i.e. electric coils, to ground.

The anti-slip valve units can assume four overall states.

The first state is defined as "filling" and corresponds to a state in which both the electro-pneumatic valves are de-energized, as shown in FIG. 2: the electro-pneumatic valve allows access to the pressure present in a pneumatic conduit, corresponding to the pneumatic conduit of FIG. 1, to a brake cylinder, corresponding to the brake cylinder of FIG. 1, while the electro-pneumatic valve prevents the emptying of the brake cylinder and of the pneumatic conduit to the atmosphere. This state represents the rest, or non-intervention, state of the anti-slip device, as it actually constitutes a direct connection between the brake cylinder and the pneumatic conduit, through which the brake system directly controls the pressure to the brake cylinder from a null value to a maximum value.

The second state is defined as "holding" and corresponds to a state in which the electro-pneumatic valve is energized. In this case, the pressure in the brake cylinder cannot be changed by pressure variations in the pneumatic conduit. The electro-pneumatic valve continues to keep the brake cylinder isolated from the atmosphere. Overall, the pressure to the brake cylinder maintains its value indefinitely unless there are leaks in the brake cylinder.

The third state is defined as "discharge" and corresponds to a state in which both the electro-pneumatic valves are energized. In this case, the pressure in the brake cylinder cannot be changed by pressure variations in the pneumatic conduit. The energized electro-pneumatic valve connects the brake cylinder to the atmosphere, reducing the pressure to the brake cylinder, possibly down to the null value.

The fourth state is defined as "prohibited" and corresponds to a state in which only the electro-pneumatic valve is energized. In this case, the electro-pneumatic valve connects both the brake cylinder and the pneumatic conduit directly to the atmosphere, causing an undue discharge to the atmosphere of the pressure produced by the brake system.

The anti-slip devices are regulated by European railway regulations:

UIC541-05 "BRAKES—SPECIFICATIONS FOR THE CONSTRUCTION OF VARIOUS BRAKE PARTS—WHEEL SLIDE PROTECTION DEVICE (WSP)"

EN15595 "Railway applications—Braking—Wheel slide protection"

Both standards pay close attention to the case in which the railway train can be operated at speeds above 200 Km/h. In particular, EN15595 § 4.2.4.3 "Special features of WSP systems for high speeds (v>200 km/h)" and sub-chapters, recommends the use of a WRM "Wheel Rotation Monitoring" device, i.e. for monitoring the rotation of the wheels, in charge of verifying that the estimated linear instantaneous speed of the single axle, derived from its instantaneous angular speed, does not fall below a linear instantaneous limit speed, which is a function of a vehicle reference linear speed, for more than 10 seconds.

Furthermore, in § 4.2.4.3.3 "Recommended features," it is recommended that the WRM device be equipped with the functionality of being able to remove the braking force in the event that the estimated linear instantaneous speed of the single axle falls below the reference linear speed of the vehicle, however limiting the removal of the braking force for a period not exceeding 10 seconds.

Furthermore, in § 4.2.4.3.2 "Functional characteristics" it is recommended that the electrical/electronic circuits of the WRM device be independent of the electrical/electronic circuits of the anti-slip device.

The § 4.2.4.3.3 recommendation implies the possibility that the WRM device may act on an electro-pneumatic valve, referred to as discharge solenoid valve, which causes the discharge of the brake cylinder associated with the axle that has been verified as subjected to the estimated linear speed loss below the reference linear speed of the vehicle.

The § 4.2.4.3.2 recommendation prevents the WRM device from acting electrically on one of the solenoids belonging to the anti-slip valve modules, as this would involve sharing portions of the electrical circuit.

The prior art provides that the discharge solenoid valve, should it be activated both by the anti-slip device and by the WRM device, is provided with two independent solenoids, in particular a first solenoid assigned to the anti-slip device and a second solenoid assigned to the WRM device.

EP1577185 describes an integrated system consisting of a WSP anti-slip device and a WRM device, also known as an Anti-lock device. In particular, FIG. 2 of EP1577185, shown as FIG. 3 in the present patent application, illustrates an anti-slip valve with electro-pneumatic pilot valves, made redundant by electro-pneumatic pilot valves, respectively. The electro-pneumatic pilot valves are controlled by the anti-slip device and the electro-pneumatic pilot valves are controlled by the anti-lock device, if a failure of the anti-slip device has been identified, or the estimated instantaneous linear speed of the single axle associated with said electro-pneumatic valves falls below the linear reference speed of the vehicle, as recommended in EN15595 § 4.2.4.3.

The recent developments of railway braking systems have led to a considerable integration and simplification of the railway braking systems, such that the electro-pneumatic components for controlling the braking pressure and the electro-pneumatic components for controlling the anti-slip function coincide. Examples are patent EP3148853 and patent EP2830918.

In FIG. 1 of EP3148853, shown as FIG. 4 in the present patent application, the electro-pneumatic valve operates, as described in EP3148853, as a pilot for filling a pilot chamber of the relay valve (RV) controlled by the braking control unit (BCU) both in the braking control phase and in the anti-slip phase. Furthermore, the electro-pneumatic valve acts as a pilot for emptying the pilot chamber of the relay valve (RV) controlled by the braking control unit (BCU) both during the braking control phase and in the anti-slip phase. Complex interlocking logic controls the software braking control and anti-slip control functions, both of which access the same electro-pneumatic valves to implement the respective functions. Furthermore, it is prior art that in most applications a railway braking system is provided with a function defined as Remote Release. This Remote Release function is necessary to remedy cases of unwanted residual pressure present in the brake cylinders associated with said braking system. Said residual pressure can be maintained at the brake cylinders due to an unexpected failure of one or more components constituting said braking system. A residual pressure, when of high value, can cause the locking of the associated wheels with consequent serious damage to the wheels at the point of contact with the rail. A residual pressure, when of a value not such as to cause the wheels to lock, causes a continuous unwanted braking action due to a dangerous overheating of the braking friction elements, with the risk of starting a fire, particularly serious in underground trains, inside tunnels with no escape route for passengers. The Remote Release function is normally implemented by means of an electro-pneumatic valve inserted inside the braking system in a pneumatic diagram position where, in rest condition, or de-energized, it does not interfere with the normal functions of said braking system. When the driver, or any automatic train control system, such as the TCMS Train Control Monitoring System, decide to release the brake due to an identified residual pressure on the brake cylinders, they perform an action that leads to the excitation of the electro-pneumatic Remote Release valve. In the excited condition, the electro-pneumatic remote release valve must perform two fundamental actions:

avoid the flow of compressed air to the associated brake cylinders, also avoiding that the compressed air source to still be able to release additional air in other directions, such as at atmospheric pressure cause the associated brake cylinders to discharge at atmospheric pressure.

In FIG. 1 of EP2830918, shown as FIG. 6 in the present patent application, the electro-pneumatic valves "Axel 1 Hold MV" and "Axel 2 Hold MV" operate as filling pilots towards the respective associated brake cylinders (BCP1, BCP2) acting on the pneumatic valves, respectively. Furthermore, the electro-pneumatic valves "Axel 1 Vent MV" and "Axel 2 Vent MV" operate as venting pilots towards the respective associated brake cylinders (BCP1, BCP2) acting on the pneumatic valves, respectively. Also in this case the electro-pneumatic valves are used by the integrated control electronics simultaneously for the braking pressure control and anti-slip control functions.

Both devices described can find applications in braking systems for railway vehicles/trains operating at speeds above 200 km/h. However, the introduction of additional electro-pneumatic components to meet EN15595 § 4.2.4.3 "Special features of WSP systems for high speeds (v>200 km/h)" and sub-chapters, compromises the levels of simplicity and integration achieved by said devices.

WO2019/053599 A1 describes a control system for service and emergency braking, however the above problems still remain unsolved.

SUMMARY OF THE INVENTION

An object of the present invention is to provide a solution that is able to meet the EN15595 § 4.2.4.3 standard "Special features of WSP systems for high speeds (v>200 km/h)" and sub-chapters, without compromising the levels of simplicity and the solution integration.

The present invention is applicable to conventional systems.

In summary, the present invention therefore describes the use of an electro-pneumatic valve having a Remote Release function, present in a braking system, as an actuator to be assigned to a WRM device to fulfill the recommendations reported in EN15595 § 4.2.4.3.2 and § 4.2.4.3.3.

The above and other objects and advantages are achieved, according to an aspect of the invention, by a rotational monitoring system of at least one axle for a railway vehicle or train having the features defined in claim 1. Preferred embodiments of the invention are the defined in the dependent claims, whose content is to be understood as an integral part of the present description.

BRIEF DESCRIPTION OF THE DRAWINGS

The functional and structural features of some preferred embodiments of a rotational monitoring system of at least one axle for a railway vehicle or train according to the invention will now be described. Reference will be made to the accompanying drawings, in which.

DETAILED DESCRIPTION

Figure 1:
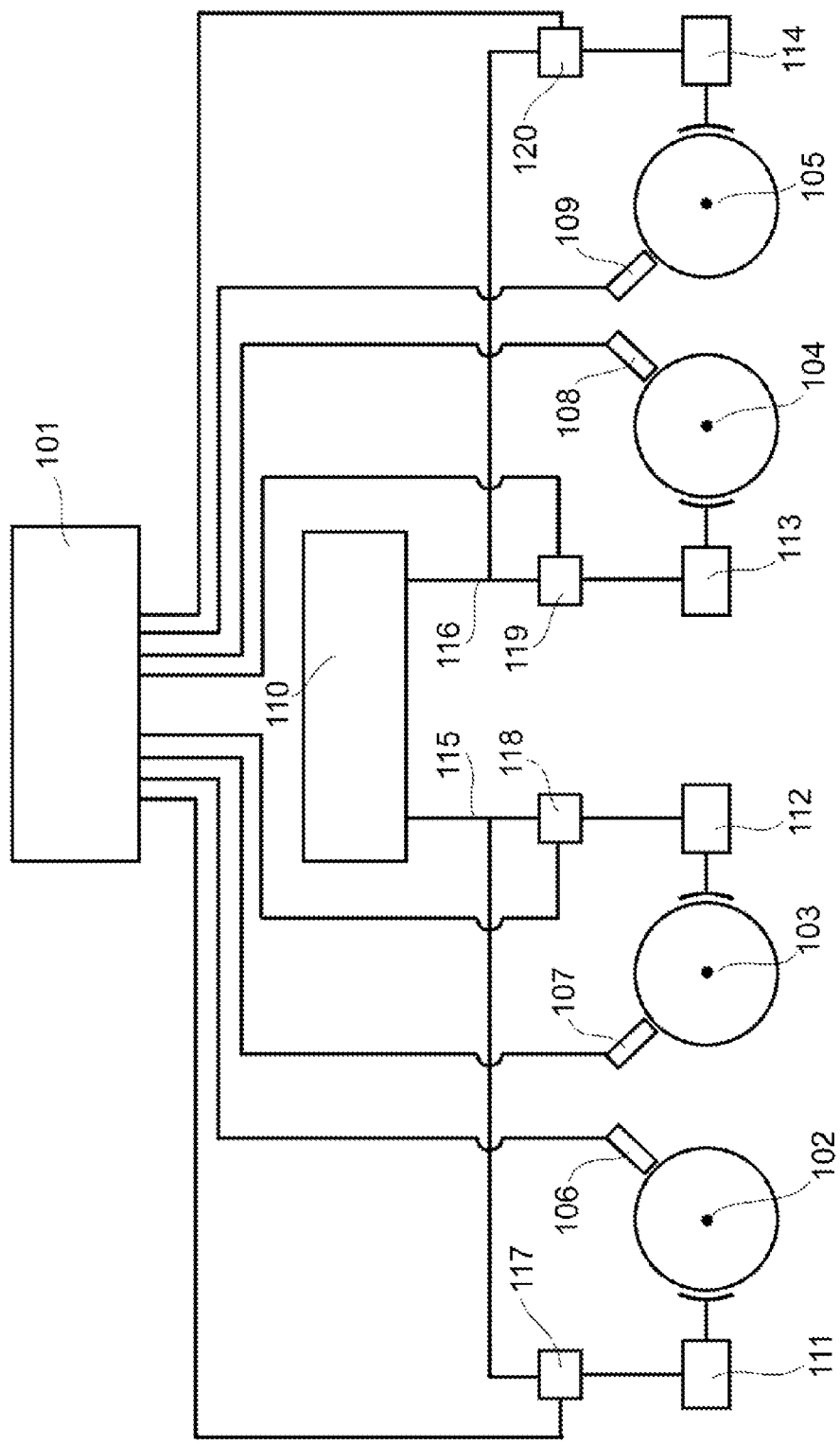
FIG. 1 shows a complete anti-slip system according to the prior art.
Figure 2:
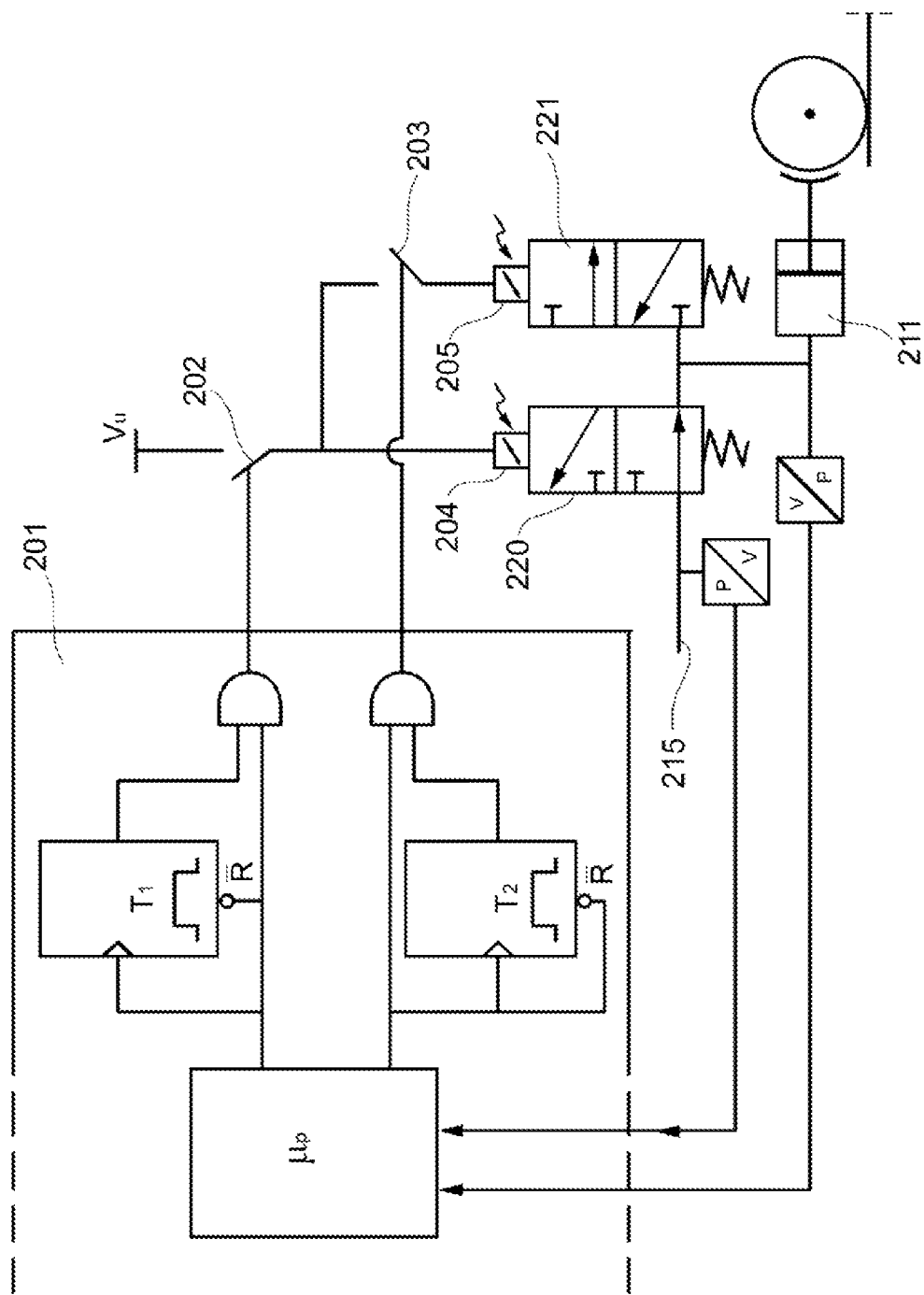
FIG. 2 shows the detail of an anti-slip valve unit and the control circuits of an anti-slip device.

Before explaining a plurality of embodiments of the invention in detail, it should be noted that the invention is not limited in its application to the construction details and to the configuration of the components presented in the following description or shown in the drawings. The invention can take other embodiments and be implemented or practically carried out in different ways. It should also be understood that the phraseology and terminology are for descriptive purpose and are not to be construed as limiting. The use of "include" and "comprise" and variations thereof are intended as including the elements cited thereafter and their equivalents, as well as additional elements and equivalents thereof.

Figure 4:
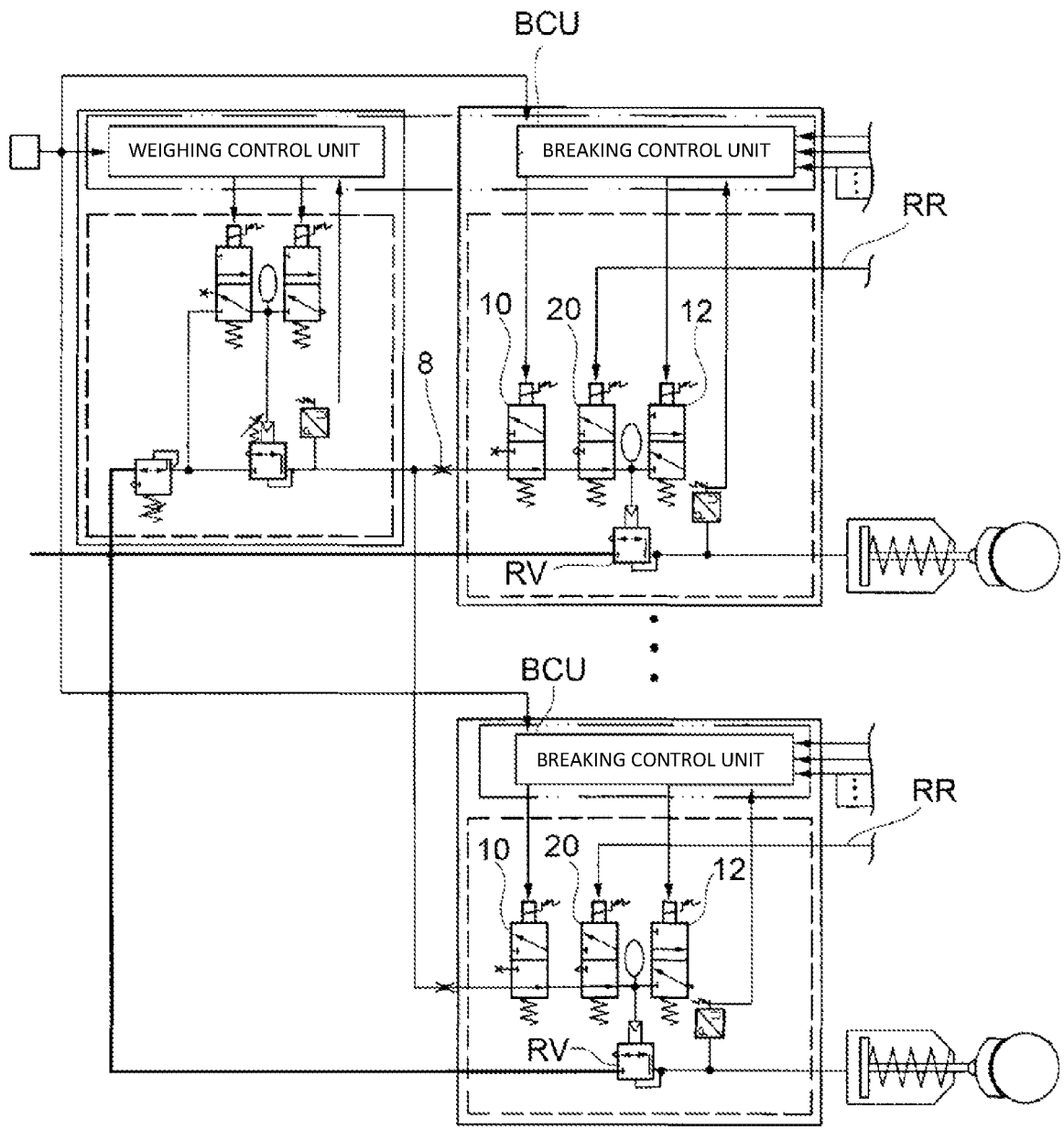
FIG. 4 shows a known integrated railway braking system.

Referring to FIG. 4, an integrated railway braking system includes an electro-pneumatic valve for remote release, as explained above in detail, piloted by the electric signal (RR) coming from the outside.

This electro-pneumatic valve, when de-energized, constitutes a direct pneumatic passage between an electro-pneumatic filling valve and a pilot chamber of a relay valve (RV), in fact not interfering with the functionality of said electro-pneumatic filling valve.

Furthermore, the electro-pneumatic valve, when de-energized, does not interfere with an electro-pneumatic discharge valve. When the valve is energized, as a consequence of an external command, said valve blocks the outflow of air from an outlet port of the electro-pneumatic filling valve, whatever the energized/de-energized condition of said electro-pneumatic filling valve, and connects the pilot chamber of the relay valve (RV) to the atmosphere, whatever the energized/de-energized condition of the electro-pneumatic discharge valve.

On the basis of the foregoing, advantageously, the remote release electro-pneumatic valve, if used as an actuator assigned to a WRM device, can comply with the recommendations set out in EN15595 § 4.2.4.3.2 and § 4.2.4.3.3.

In the present invention, the physical separation of the air discharge function between the electro-pneumatic valve and the electro-pneumatic valve constitutes a further advantage by providing total physical, as well as functional, redundancy between the anti-slip device and the WRM device.

Figure 3:
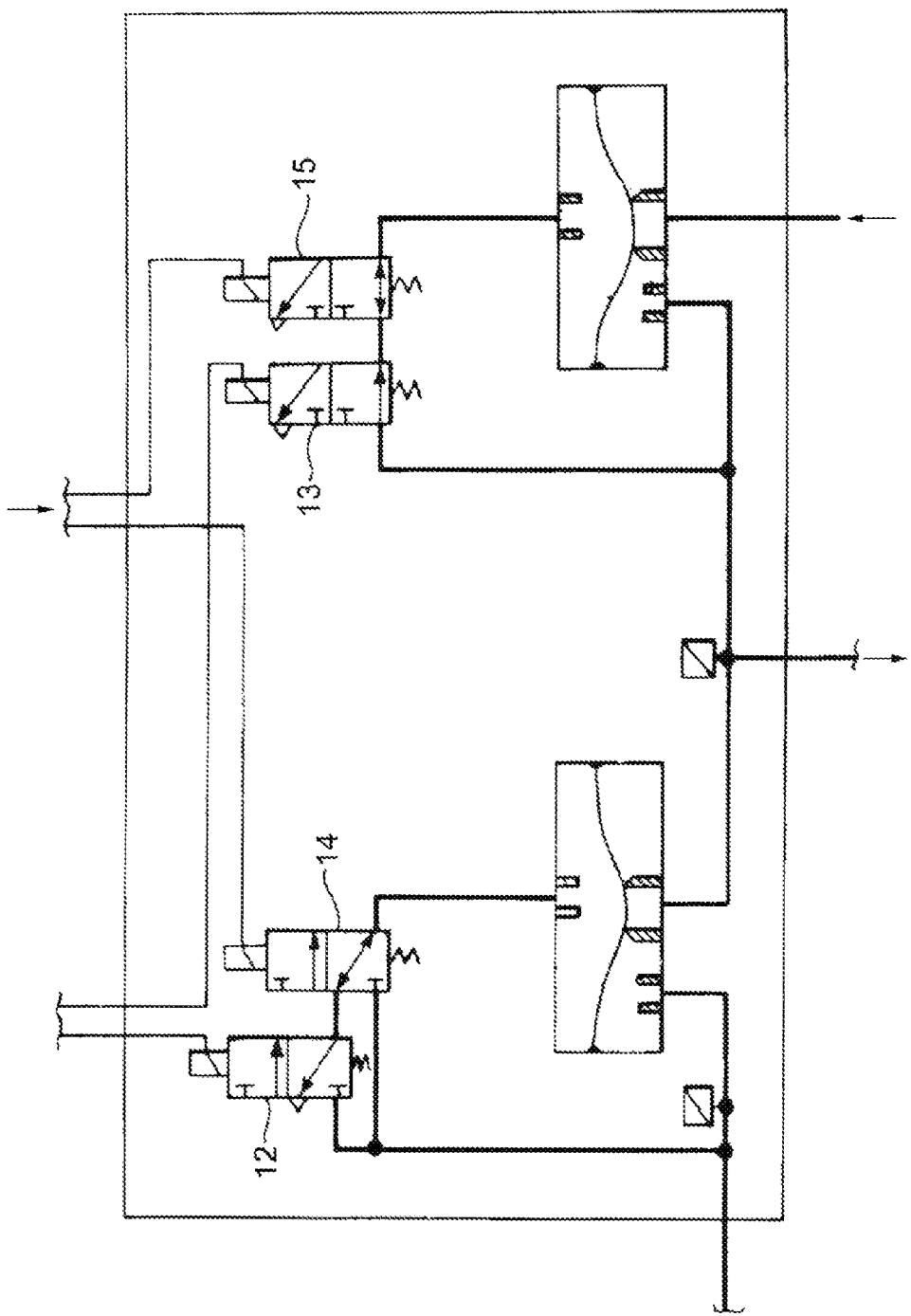
FIG. 3 shows a known anti-slip valve assembly provided with redundant pilot valves.

A similar analysis performed on the diagram in FIG. 3 leads to the same conclusions.

Therefore, in an embodiment of the invention, a rotational monitoring system of at least one WRM axle for a railway vehicle or train is arranged to identify at least one axle controlled by it having an estimated instantaneous linear speed lower than a predetermined instantaneous linear limit speed. The rotational monitoring system of at least one WRM axle for a railway vehicle or train is also arranged to remove the braking force to one or more wheels of the axle identified to have an estimated instantaneous linear speed lower than said predetermined instantaneous linear limit speed, by canceling a pressure to brake cylinders associated with said at least one axle identified to have an estimated instantaneous linear speed lower than said predetermined instantaneous linear limit speed.

The cancellation of a pressure to brake cylinders associated with said at least one axle identified to have an estimated instantaneous linear speed lower than said predetermined instantaneous linear limit speed is obtained by acting on an electro-pneumatic valve (RR) arranged to perform a Remote Release function associated with the pneumatic circuits generating brake pressure for said brake cylinders and adapted to cancel a residual braking pressure.

A possible but not exclusive integration solution between the WRM device and the valve performing the Remote Release function is now described.

Figure 5:
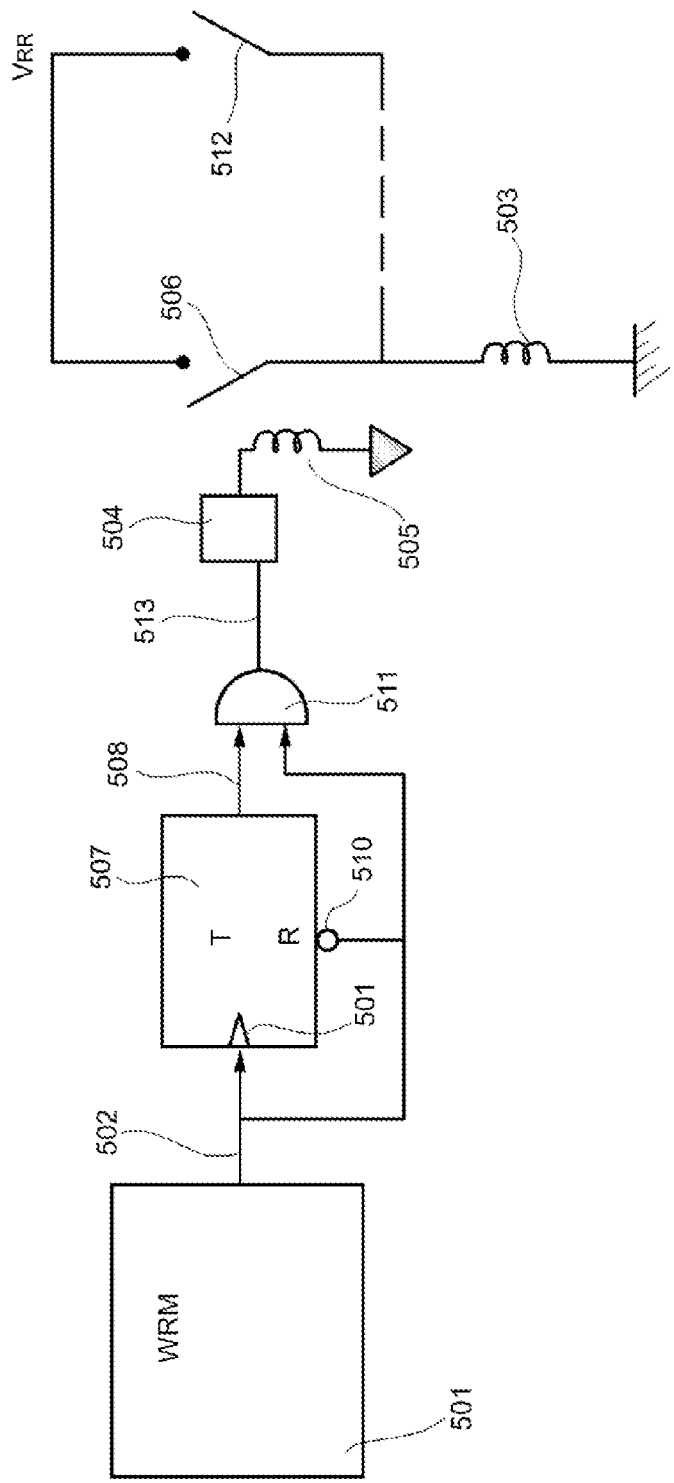
FIG. 5 shows an embodiment of the present invention.
Figure 6:
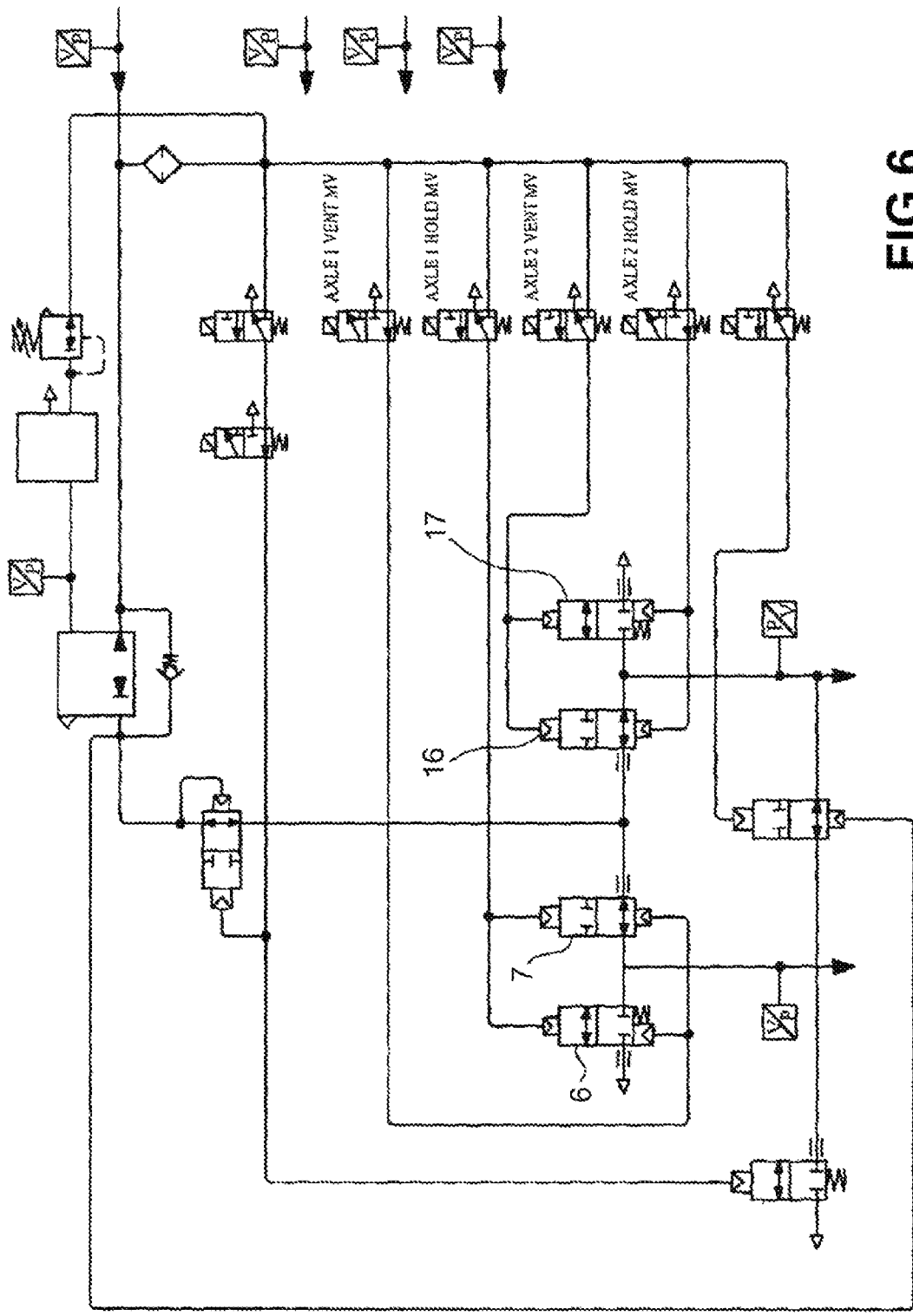
FIG. 6 shows a known integrated railway braking system.

Referring to FIG. 5, the WRM device, for example consisting of a microprocessor system, generates a signal which assumes logic level "1" when the WRM device intends to energize the electro-valve RR which performs the Remote Release function, feeding the solenoid thereof. The signal activates a monostable circuit whose output assumes logic level "1" for a maximum time T following a transition 0→1 by said signal on its input. Output again assumes logic value "0" after time T has run out or if signal again assumes logic level "0" causing a reset of monostable through its input "R". The AND gate conditions the signal with the signal and drives a driver adapted to possibly translate the voltage level to supply the solenoid of a relay, whose contact supplies the solenoid with the voltage (Vrr), directly or through a dedicated power supply. The set of monostable circuit and AND gate limits the consecutive energization of the electro-pneumatic remote release valve to a maximum time (T).

The contact placed in parallel with the contact is available to the driver or to the TCMS system to operate on the solenoid of the electro-pneumatic valve performing the Remote Release function, in the usual way.

The relay consisting of solenoid and contact can be replaced by an opto-isolated switching element, for example but not exclusively by an opto-MOS, or by a functionally equivalent electronic circuit.

If the software of the WRM device is developed at a SIL≥3 safety level according to EN50128 standards, then the timeout function can be implemented directly within the software code of said WRM device.

In other words, the electro-pneumatic valve (RR) arranged to perform a Remote Release function may be conditioned by a hardware timeout circuit, or by a software timeout function, arranged to limit an excitation command of a solenoid associated with said electro-pneumatic valve (RR) for a predetermined continuous time (T).

The software timeout function can be performed directly within a software of the rotational monitoring system of at least one WRM axle.

The predetermined continuous time (T) can take a value of 10 seconds. In fact, by setting T=10 s the recommendation reported in EN15595 § 4.2.4.3.3 is satisfied.

In a further aspect, the predetermined instantaneous linear limit speed is a function of a linear reference speed of the vehicle.

Various aspects and embodiments of a method for implementing a rotational monitoring system of at least one axle for a railway vehicle or train according to the invention have been described. It is understood that each embodiment may be combined with any other embodiment. The invention, moreover, is not limited to the described embodiments, but may be varied within the scope defined by the appended claims.

The invention claimed is:

1. Rotational monitoring system of at least one axle for a railway vehicle or train,
a rotation monitoring system of at least one axle being arranged for:
identifying at least one axle controlled by it having an estimated instantaneous linear speed lower than a predetermined instantaneous linear limit speed;
removing a braking force to one or more wheels of the axle identified to have an estimated instantaneous linear speed lower than said predetermined instantaneous linear limit speed, by canceling a pressure to brake cylinders associated with said at least one axle identified to have an estimated instantaneous linear speed lower than said predetermined instantaneous linear limit speed;
the rotational monitoring system of at least one axle being characterized in that a cancellation of a pressure to brake cylinders associated with said at least one axle identified to have an estimated instantaneous linear speed lower than said predetermined instantaneous linear limit speed is obtained by acting on an electro-pneumatic valve arranged to perform a Remote Release function associated with pneumatic circuits generating brake pressure for said brake cylinders and adapted to cancel a residual braking pressure.

2. Rotational monitoring system of at least one axle according to claim 1, wherein the electro-pneumatic valve arranged to perform a Remote Release function is conditioned by a hardware timeout circuit, or by a software timeout function, arranged to limit an excitation command of a solenoid associated with said electro-pneumatic valve for a predetermined continuous time.

3. Rotational monitoring system of at least one axle according to claim 2, wherein the predetermined continuous time assumes a value equal to or greater than 10 seconds.

4. Rotational monitoring system of at least one axle according to claim 2, wherein the software timeout function is realized directly inside a software of the rotational monitoring system of at least one axle.

5. Rotational monitoring system of at least one axle according to claim 1, wherein said predetermined instantaneous linear limit speed is a function of a linear reference speed of the vehicle.

* * * * *